US005492511A

United States Patent [19]

Kozminski

[11] Patent Number: 5,492,511

[45] Date of Patent: Feb. 20, 1996

[54] APPARATUS FOR INTERLOCKING THROTTLE, DYNAMIC BRAKE AND REVERSER HANDLES ON A CONTROL STAND OF A RAILWAY LOCOMOTIVE

[75] Inventor: Steve Kozminski, Rutland, Mass.

[73] Assignee: Westinghouse Air Brake Company, Wilmerding, Pa.

[21] Appl. No.: 340,215

[22] Filed: Nov. 16, 1994

[51] Int. Cl.[6] .............................. B60K 41/20; G05G 5/08

[52] U.S. Cl. ............................ 477/27; 74/483 R; 477/22; 477/94; 477/96

[58] Field of Search ................................. 477/22, 27, 94, 477/96; 74/483 R; 318/375

[56] References Cited

U.S. PATENT DOCUMENTS

| | | | |
|---|---|---|---|
| 708,724 | 9/1902 | Merrick et al. | 74/483 R |
| 3,410,151 | 11/1968 | Adams et al. | 74/483 R |
| 3,710,055 | 1/1973 | Blonn, Sr. | 74/483 R X |
| 3,842,653 | 10/1974 | Blonn, Sr. | 74/483 R X |
| 4,092,577 | 5/1978 | Markham | 318/370 |
| 4,796,480 | 1/1989 | Amos et al. | 74/483 R |
| 5,134,895 | 8/1992 | Harmon et al. | 74/483 R |

*Primary Examiner*—Charles A. Marmor
*Assistant Examiner*—Troy Grabow
*Attorney, Agent, or Firm*—James Ray & Associates

[57] ABSTRACT

Apparatus for interlocking independent control handles for throttle, dynamic brake and reverser, within a control stand for a railway transit vehicle including:

a first cam disk perpendicularly mounted to the throttle handle axle for rotation therewith, the periphery of which is defined by at least a partial cylindrical first surface radially spaced from the first axle, and a partial concave second surface adjacent to the partial cylindrical first surface, a second cam disk of substantially similar configuration perpendicularly mounted to the dynamic brake handle axle for rotation therewith, the first and second cam disks being disposed in a common plane and directly adjacent to one another such that the concave second surfaces of each cam disk are directly opposed one another, so that only one of the throttle or dynamic brake handles can be pivoted at any given time by virtue of the first cylindrical surface on the associated cam disk moving into engagement with the opposed concave second surface of the adjacent cam disk, and a first and stop means associated with the reverser axle adapted to block pivotal rotation of the throttle handle when the reverser handle is in any position other than forward, reverse and neutral, and a second stop means adapted to block pivotal rotation of the dynamic brake handle when the reverser handle is in any position other than forward and reverse.

20 Claims, 4 Drawing Sheets

APPARATUS FOR INTERLOCKING THROTTLE, DYNAMIC BRAKE AND REVERSER HANDLES ON A CONTROL STAND OF A RAILWAY LOCOMOTIVE

FIELD OF THE INVENTION

The present invention relates generally to a control stand for a locomotive or other railway transit vehicle, and more particularly to mechanical apparatus for interlocking the throttle, dynamic brake, and reverser control handles to either allow or preclude certain control handle motions, to provide proper manual sequencing of independent control handle motions, safety lockout of certain improper motions, and tactile feedback to the operator or engineer that attempted control handle motions are allowed or not allowed.

CROSS REFERENCE TO RELATED APPLICATIONS

The invention taught in this patent application is closely related to the inventions taught in the following co-pending patent applications: Ser. No. 08/340,525 titled Electronically Controlled Locomotive Throttle Controller Including Remote Multiple Unit Throttle Control; Ser. No. 08/340,651 titled Method And Apparatus For Determining And Encoding The Position Of A Reverser Handle On A Locomotive Control Stand; Ser. No. 08/340,235 titled Digital Output Control Device and Method For Operating; Ser. No. 08/340,237 titled Method And Apparatus For Feedback Of Trainline Status To The Central Processor Of A Locomotive Throttle Controller; Ser. No. 08/340,652 titled Method Of Performing Diagnostics On An Electronically Controlled Railway Locomotive Throttle Controller; Ser. No. 08/340,237 titled Method Of Operating A Locomotive Mounted Throttle Controller Between Two Modes Of Operation Including A Transition Between Such Two Modes; Ser. No. 08/340,742 titled An Apparatus For And A Method Of Generating An Analog Signal For Control Of Dynamic Braking; Ser. No. 08/340,232 titled An Apparatus For Feedback Of An Analog Signal Used To Monitor And/Or Control Dynamic Braking And Method Of Operating; Ser. No. 08/340,213 titled An Apparatus To Enable Controlling A Throttle Controller From A Remote Host; Ser. No. 08/340,538 titled Apparatus For Interlocking Reverser Handle On A Control Stand Of A Railway Locomotive; and, Apparatus For Determining The Absolute Position Of Throttle, Dynamic Brake And Reverser Handles On A Locomotive Control Stand. Each of the above-referenced patent applications were filed concurrently on Nov. 16, 1994 and are assigned to the assignee of this invention. Additionally, the teachings of each of these patent applications is incorporated herein by reference thereto.

BACKGROUND OF THE INVENTION

In railroad locomotive operations, the throttle, dynamic brake and reverser actions of the locomotive, locomotives or other drive units, are controlled by the operator or engineer in the cab of the lead unit by manipulating three handles extending from the control stand, one handle each for throttle, dynamic brake, and reverser. The throttle handle, of course, controls the development of the tractive effort of the locomotive; i,e, the diesel engines or other power units. The dynamic brake handle controls the development of a retarding force known a dynamic brake, for example the electric motors driving the locomotive wheels, to place them in either motor mode where they will drive the wheels, or in generator mode, where they will function as a retarding force. The reverser handle controls the forward and reverse rotation of the electric motors to selectively drive the train forward or rearward, and includes a neutral position. Pursuant to current practice, the control stand is designed to be a man-to-machine interface and ideally is strictly an electronic/electric device having no direct mechanical, hydraulic or pneumatic connections the devices controlled. Instead, encoding means are preferably provided within the control stand to read and interpret the positions of the three handles, and convey appropriate signals, indicative of such positions, to an associated microcomputer. The associated microcomputer is programmed to interpret the encoded signals regarding the positions of the throttle, dynamic brake and reverser handles, as positioned at the control stand, and then electronically issue corresponding commands to manipulate the devices intended within the locomotive or locomotives. When utilizing a microcomputer, the throttle, dynamic brake and reverser commands effected at the control stand, are dependent upon the given angular positions of the three control handles, which are normally sensed and monitored by rotary encoding devices, which are mechanically coupled to associated rotary axles to which the control handles are secured, utilizing cams to actuate microswitches or contacts to provide a signal to the microcomputer as noted above. Since such mechanical devices leave a lot to be desired, there have been improvements recently that rely on electronic means to achieve a more exacting degree of handle position determination, which are not as prone to mechanical failure, are not as cumbersome and space consuming, and do not require frequent adjustment.

It has of course been highly desirable to provide an interlocking mechanism within the control stand to prevent certain handle movement which are inconsistent with the intended results, such as simultaneously requiring throttle and dynamic brakes actions, or application of the dynamic brake when the reverser is in neutral. While a variety of such interlocking mechanisms have been utilized in the prior art control stands, most tend to be rather complicated, utilizing a significant number of moving parts which greatly complicate assembly of the control stand, and lead to limited durability and reliability.

SUMMARY OF THE INVENTION

The present invention is predicated upon a new and unique interlocking mechanism of multiple axes or shafts, that is passive in nature and employs only a single moving part per axle.

In essence, the interlocking apparatus of this invention is incorporated into a more or less conventional control stand having a first pivotal lever handle for controlling throttle action secured to a first rotatable axle, a second pivotal lever handle for controlling dynamic brake action secured to a second rotatable axle spaced from and parallel to the first rotatable axle, and a third pivotal lever handle for controlling reverser action secured to a third rotatable axle spaced from and parallel to the first and second rotatable axles. As is also conventional practice, the third pivotal lever handle is pivotal to three positions, namely, a "neutral" position at the center, and "forward" and "reverse" positions at either end. Typically, the reverser handle is removable when in the neutral position as a "key" to thereby "lock" the control stand with the throttle lever handle in the idle position, the dynamic brake lever handle in the "off" position, and the reverser handle, of course, in the neutral position. With the reverser handle so removed, the control panel cannot be operated.

The primary essential elements of the inventive interlocking mechanism include a first cam disk perpendicularly mounted to the first axle for rotation therewith, the periphery of which is defined by at least a partial cylindrical first surface radially spaced from the first axle to which it is attached, and a partial concave second surface adjacent to the partial cylindrical first surface. A second cam disk, which can be substantially identical to the first cam disk, is perpendicularly mounted to the second axle for rotation therewith, the periphery of which is defined by at least a partial cylindrical first surface radially spaced from the second axle, and a partial concave second surface adjacent to the partial cylindrical first surface. The first and second cam disk are mounted to be disposed in a common plane and directly adjacent to one another so that the concave second surfaces of each cam disk are directly opposed to one another. Accordingly, only one of the first or second pivotal lever handles can be pivoted at any given time by virtue of the first cylindrical surface on the associated cam disk moving into engagement with the opposed concave second surface of the adjacent cam disk.

In addition to the above, a first stop means associated with the third axle is provided which is adapted to block pivotal rotation of the first pivotal lever handle when the third pivotal lever handle is in any position other than forward, reverse and neutral; and also another, or second stop means, associated with the third axle is provided which is adapted to block pivotal rotation of the second pivotal lever handle when the third pivotal lever handle is in any position other than forward and reverse. Accordingly, a third cam member is rotatably secured to the third axle for rotational movement with said third axle, and includes means thereon blocking pivotal movement of the first and second pivotal lever handles as indicated above.

OBJECTS OF THE INVENTION

It is, therefore, one of the primary objects of the present invention to provide a new and improved mechanical apparatus for interlocking the throttle, dynamic brake, and reverser control handles in a control stand of a locomotive or other railway transit vehicle, to either allow or preclude certain control handle motions to provide proper manual sequencing of independent control handle motions, safety lockout of certain undesired motions, and tactile feedback to the operator or engineer that attempted control handle motions are allowed or not allowed.

It is another primary object of the present invention to provide a new and improved mechanical apparatus for interlocking the throttle, dynamic brake, and reverser control handles in a control stand for a locomotive or other railway transit vehicle, to either allow or preclude certain control handle motions which is passive in nature and employs only a single moving part per axle.

Another object of this invention is to provide a new and improved mechanical apparatus for interlocking the throttle, dynamic brake, and reverser control handles in a control stand of a locomotive or other railway transit vehicle, to either allow or preclude certain control handle motions which is simple in construction and easily installed within the control stand.

These and other objects and advantages will be realized from particularly when read in conjunction with the attached drawings, a full understanding of the following detailed description as described below.

DESCRIPTION OF A PREFERRED EMBODIMENT OF THE INVENTION

Figure 1:
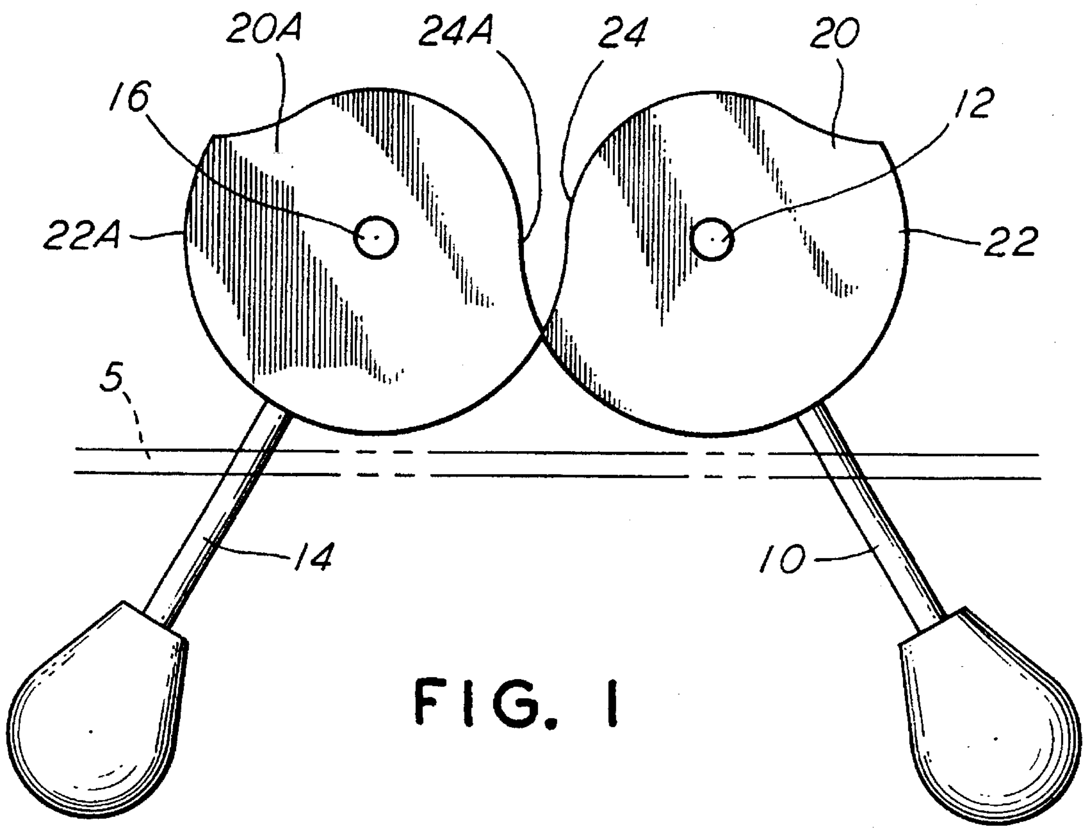
FIG. 1 is a simplified, schematic side view of the pivotal throttle and dynamic brake handles as attached to rotatable axles, showing the side-by-side relationship of the first and second cam disks when the throttle handle in the "idle" position and the dynamic brake handle in the "off" position.

Prior to proceeding with a more detailed description of the interlocking apparatus of this invention, it should be noted that throughout the several views illustrated in the attached drawings, identical components which have associated therewith identical functions have been identified with identical reference numerals for the sake of clarity.

Figure 3:
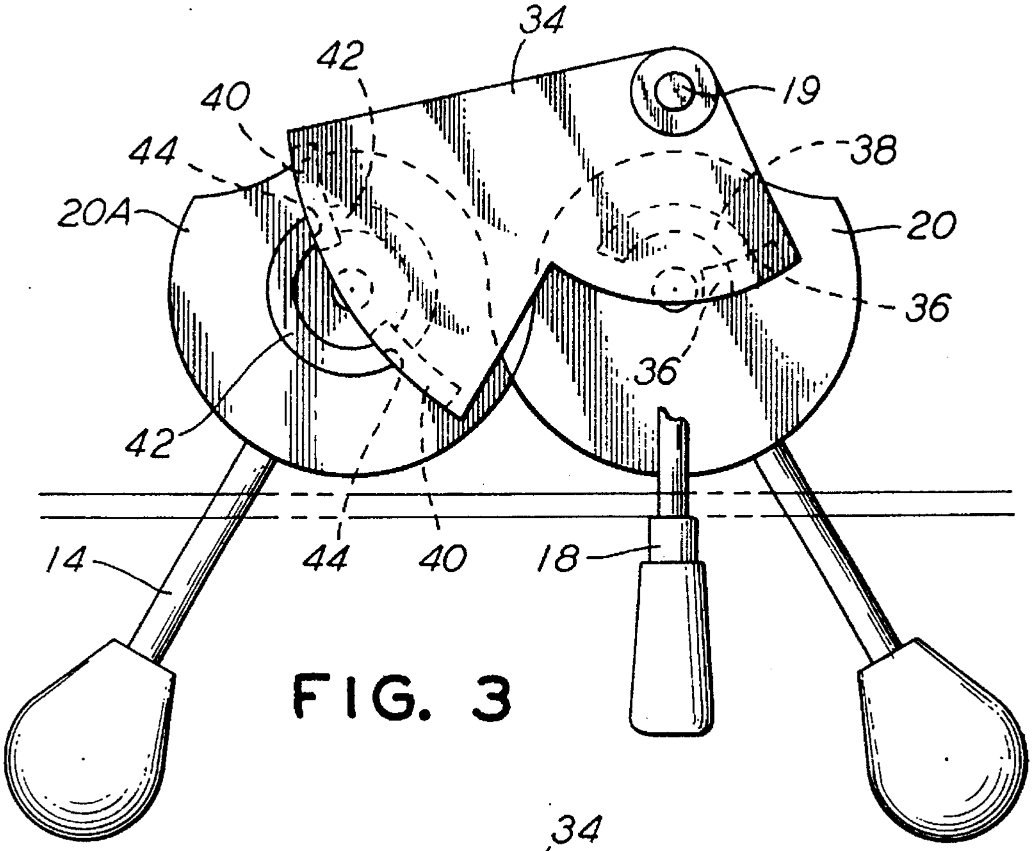
FIG. 3 is substantially like FIG. 1 except that it further shows the reverser handle and the third cam disk in its association with the first and second cam disks. As shown, the reverser control handle is in the "neutral" position to lock the dynamic brake control handle from any movement, while the throttle control handle is not locked from movement.
Figure 4:
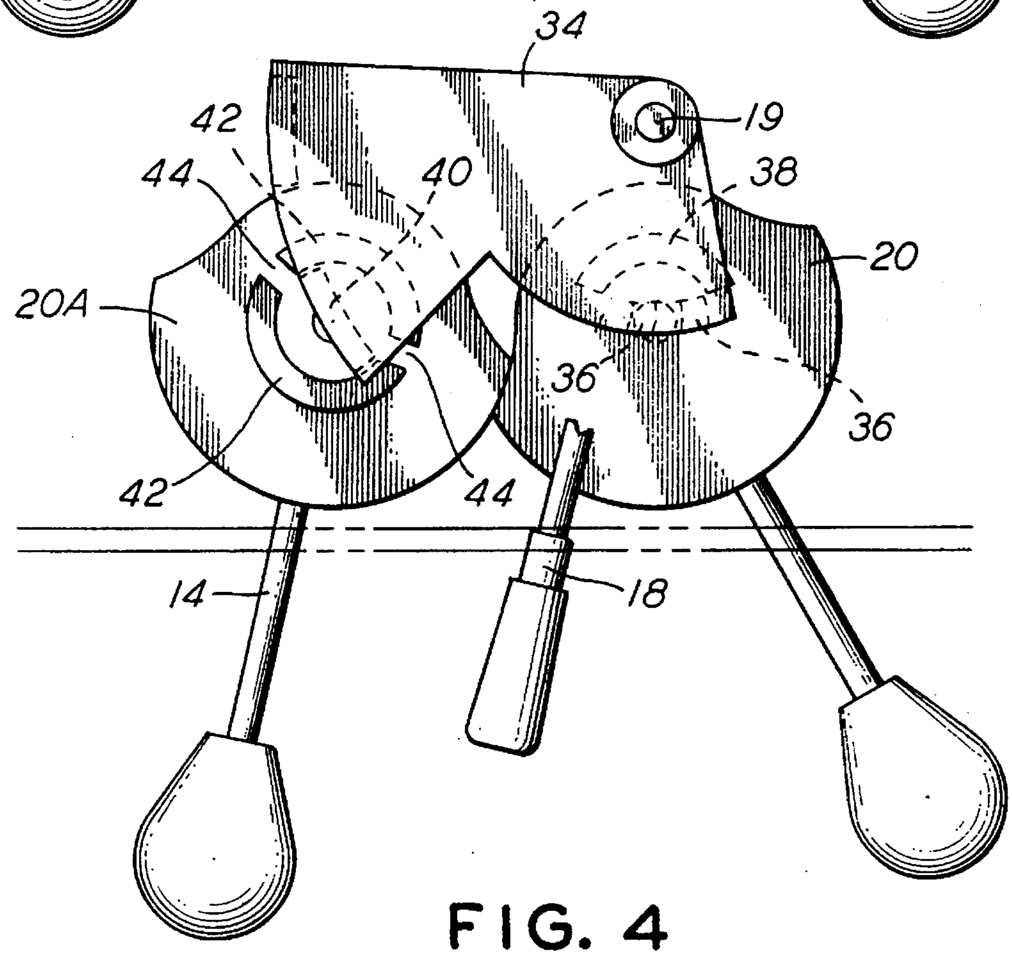
FIG. 4 is substantially the same as FIG. 3 except that it illustrates the reverser control handle in the "forward" (or "reverse") position, such that the dynamic brake control handle is not locked, but is in fact moved to an "on" position.
Figure 5:
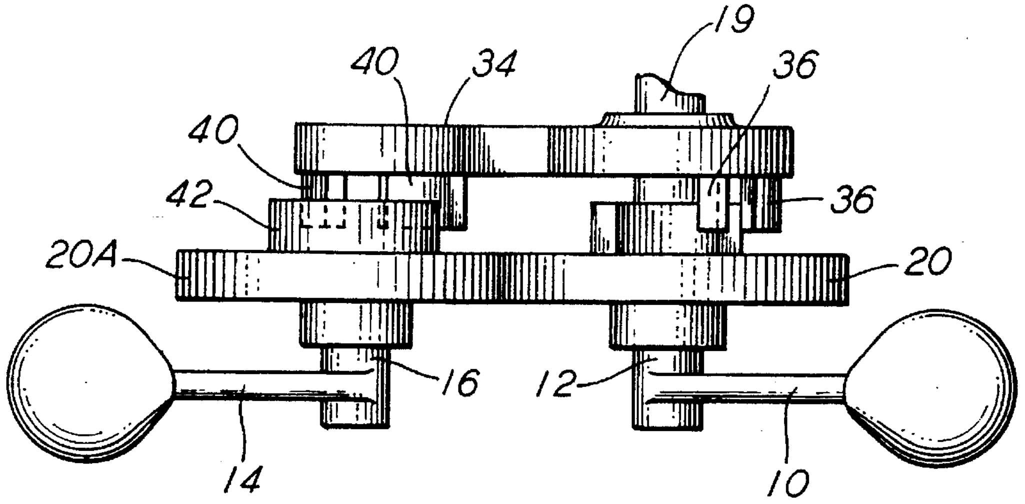
FIG. 5 is a top view of the equipment and arrangement shown in FIG. 3.
Figure 6:
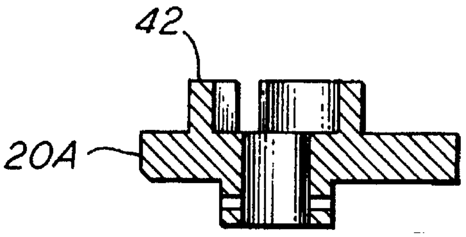
FIG. 6 is a detailed plan view of the first and second cam disks shown in the preceding Figures as manufactured in accordance with a presently preferred embodiment of this invention.
Figure 7:
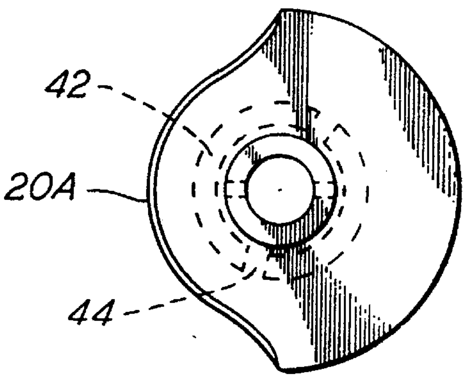
FIG. 7 is a detailed cross-sectional side view of the first and second cam disks shown in FIG. 6.
Figure 8:
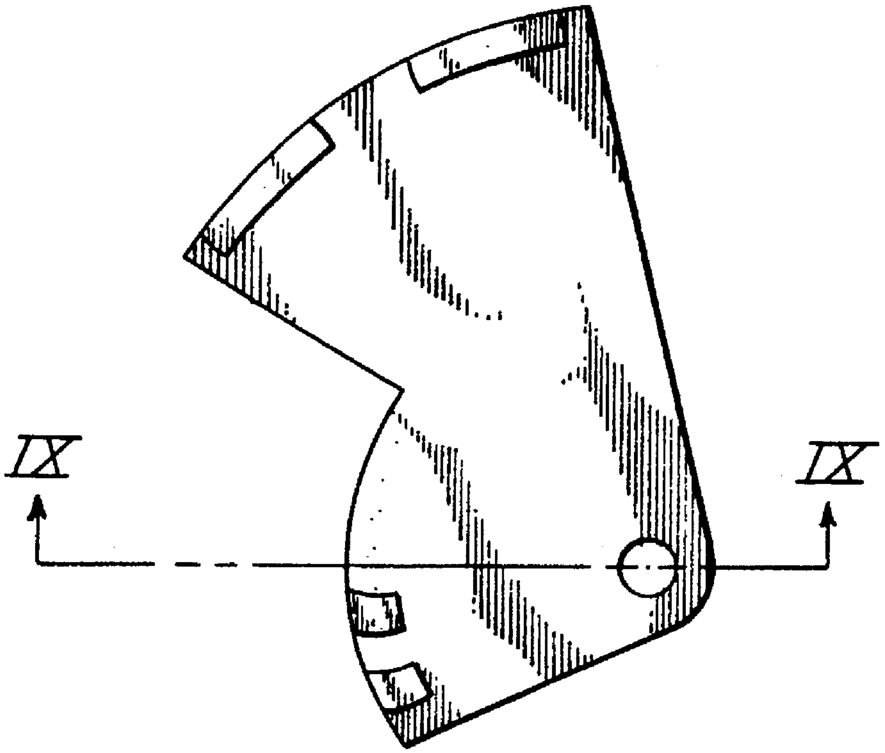
FIG. 8 is a detailed plan view of the third cam disk shown in FIGS. 3–5, as manufactured in accordance with a presently preferred embodiment of this invention.
Figure 9:
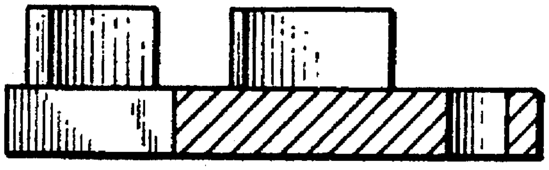
FIG. 9 is a detailed cross-sectional side view of the third cam disk shown in FIG. 8, with the section taken at lines IX—IX.

Reference is now to the several figures. Schematically illustrated therein is the inventive apparatus for interlocking independent control handles for throttle action, dynamic brake action and reverser action, within a control stand for a locomotive or other railway transit vehicle wherein the cover plate 5 of the control stand is provided with three slots (not shown) through which the three handles extend. Specifically, a first pivotal lever handle 10, is provided for controlling throttle action of the diesel engine, which is secured to a first rotatable axle 12. A second pivotal lever handle 14, for controlling dynamic brake action, is secured to a second rotatable axle 16, spaced from and parallel to the first rotatable axle 12. As shown in FIGS. 3 and 4, a third pivotal lever handle 18, for controlling reverser action is secured to a third rotatable axle 19, spaced from and parallel to the first and second rotatable axles 12 and 16 respectively. As in normal arrangements, the third pivotal lever handle 18; i.e., the reverser handle, is pivotal to three positions; namely, a neutral position at the center of the pivotal positioning, and forward and reverse positions at either end of the pivotal positioning. Detentes or other such engagements (not shown) are normally provided so that the operator or engineer can readily "feel" when the reverser handle "snaps" into one of its three required positions. In addition, the reverser handle 18 is normally removable when in the neutral position, so that it functions as a "key" and can be removed when the operator or engineer leaves the cab to thereby lock the control stand in the neutral position. The throttle and dynamic brake handles 10 and 14 respectively, on the other hand, must be arranged to be selectively positioned at any desired point along its pivotal arc, to selectively set the degree of throttle action and/or dynamic brake action desired. It is not uncommon, however, to provide a number of detentes or other stop positions along the arcuate swing, as for example eight to ten such detentes, so that the operator or engineer will have a feel for the degree of any such movement of the two lever handles he wishes to make.

Figure 2:
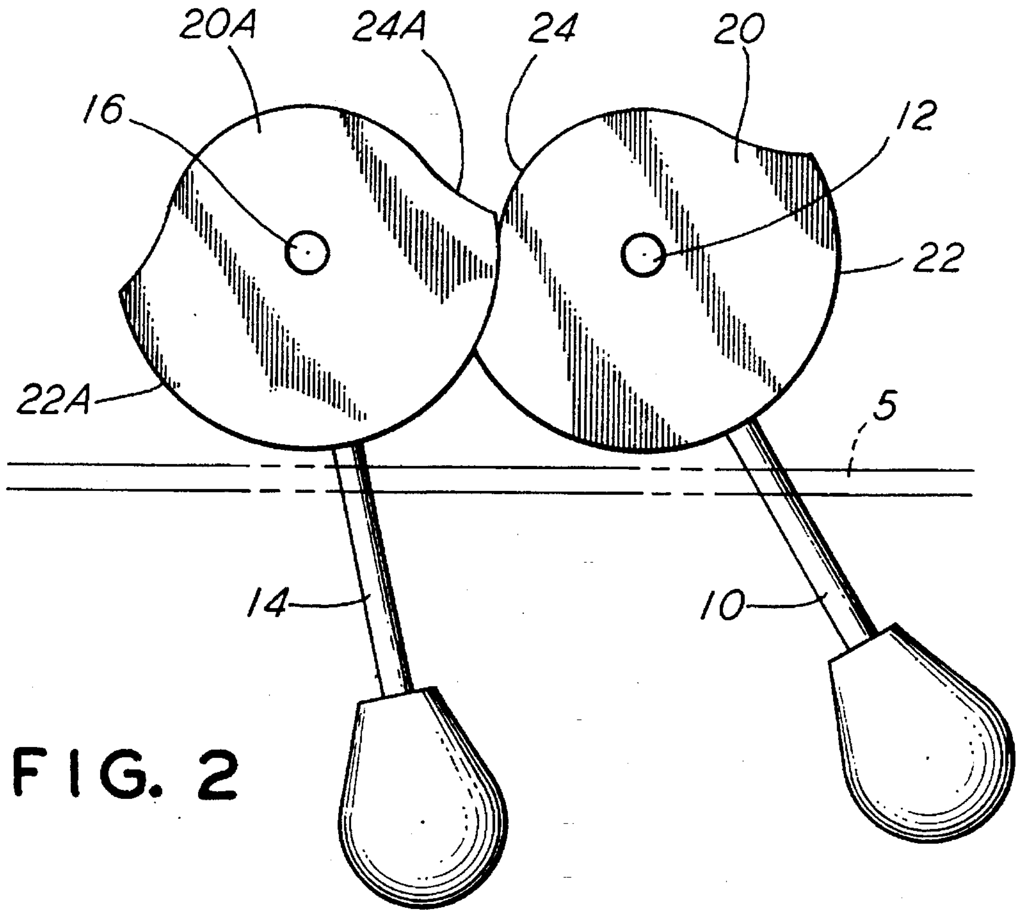
FIG. 2 is identical to FIG. 1 except that it illustrates the dynamic brake handle in the "on" position, so that the throttle handle cannot be moved to any other position.

A first cam disk 20, is perpendicularly mounted to the first axle 12 for rotation therewith, the periphery of which is defined by at least a partial cylindrical first surface 22 radially spaced from said first axle 12, and a partial concave second surface 24 adjacent to said partial cylindrical first surface 22. A second cam disk 20A is perpendicularly mounted to said second axle 16 for rotation therewith. Although not essential, the second cam disk 20A may be substantially identical to the first cam disk 20, and accordingly, has a periphery which is defined by a partial cylindrical first surface 22A radially spaced from the second axle 19, and a partial concave second surface 24A adjacent to the partial cylindrical first surface 22*a*. The first and second cam disks 20 and 20A respectively, must be disposed in a common plane and directly adjacent to one another such that the concave second surfaces 24 and 24A of the two cam disks are directly opposed one another when the throttle, (first lever handle 10) is in the "idle" position, and the dynamic brake (second lever handle 14) is in the "off" position, so that only one of the first and second pivotal lever handles 10 or 14, can be pivoted at any given time, by virtue of the first cylindrical surface 22 or 22A on cam disk 20 or 20A, rotatably moving into engagement with the opposed concave second surface 24 or 24A, of the adjacent cam disk. This is illustrated in FIG. 2, wherein the second lever handle 14, namely the dynamic brake handle, is pivoted to an "on" position. As should be quite apparent from FIG. 2, the interlocking surfaces of the two cam disk 20 and 20A are such that when in this position, it will not be possible to move the throttle handle; i.e., first pivotal handle 10. It should be further apparent that the reverse situation can be similarly effected, by visualizing a mirror image of FIG. 2. Specifically, in the opposite situation, the throttle handle; i.e., pivotal lever handle 10 could have been rotated such as to lock the second pivotal handle 14 (for the dynamic brake) in position and prevent it from being pivoted to an "on" position. Accordingly, if either pivotal lever handle 10 or 14 is pivoted from its "start position", the other pivotal lever handle cannot be similarly positioned. It should be understood, that the "start position" referred to above, represents the "idle" position for the throttle control, namely pivotal lever handle 10, and represents a fully "off" position for the dynamic brake control, namely pivotal lever handle 14.

While it is believed that the above described apparatus represents a truly unique arrangement to assure that only one of two control handles can be operated at a time, it should be further realized that other controls and lock-out are necessary to insure safe and proper activation of a locomotive control stand, particularly with regard to positioning of the reverser control. Specifically, a first stop means must be associated with the reverser control adapted to block pivotal rotation of the first pivotal lever handle 10 (throttle control), when the reverser control is in any position other than "forward", reverse and "neutral". In addition, a second stop means must be associated with the reverser control to block pivotal rotation of the second pivotal lever handle 14 (dynamic brake control) when the reverser control is in any position other than "forward" and "reverse".

Reference to FIGS. 3 and 4 will illustrate the interlocking mechanism with regard to the reverser control, wherein a third pivotal control handle 18 is secured to a third rotatable axle 19 for controlling the reverser action, specifically placing the drive motors in either the forward, reverse of neutral positions. A third cam disk 34 is rigidly secured to rotatable axle 19 for partial rotation therewith, and disposed so as to be adjacent to the first and second cam disks 20 and 20A respectively.

For purposes of interlocking the reverser control; i.e., third pivotal lever handle 18, with the throttle control, two short and parallel arcuate segments 36 are disposed to extend perpendicularly from the surface of third cam disk 34 adjacent to an upper surface of the first cam disk 20. An arcuate segment 38 is disposed to extend perpendicularly from the surface of first cam disk 20 and extend towards third cam disk 34 adjacent to the parallel arcuate segments 36. The relative positioning of arcuate segment 38 and the two, parallel arcuate segments 36, should be such that when the reverser control; i.e., the third pivotal lever handle 18, is in the neutral position, the first pivotal handle 10 (throttle control) can be activated such that arcuate segment 38 will pass between the two parallel arcuate segments 36. Furthermore, when the third pivotal lever handle 18 (reverser control) is in either the "forward" or "reverse" position, the first pivotal handle 10 (throttle control) can be still be activated such that arcuate segment 38 will pass on one side of the two parallel arcuate segments 36 when the reverser control is in the "forward" position, and will pass on the other side of the two parallel arcuate segments 36 when the reverser control is in the "reverse" position. As can readily be seen, therefore, the two arcuate segments 36 will function to obstruct arcuate segment 38, and thereby prevent movement of the throttle control: i.e. first lever handle 10, when the reverser control is in any position other than "neutral", "forward" or "reverse"; i.e., any intermediate position between the three operating positions.

For purposes of interlocking the reverser control; i.e., third pivotal lever handle 18, with the dynamic brake control, two arcuately aligned segments 40 are disposed to extend perpendicularly from the edge surface of third cam disk 34 adjacent to an upper surface of the second cam disk 20A. A pair of semi-circular segments having a tubular configuration, or a tubular member 42 is disposed to extend perpendicularly from the surface of second cam disk 20A and extend towards third cam disk 34 adjacent to the parallel arcuate segments 40. Tubular member 42 is provided with a pair of opposed slots 44 having a width equal to the thickness of the two aligned segments 40 on cam disk 34. The relative positioning of tubular member 42 and the two aligned, arcuate segments 40, should be such that when the dynamic brake control; i.e., the second pivotal lever handle 14, is in the "off" position, the two aligned segments 40 on cam disk 34 can be made to pass through the pair of slots 44 on tubular member 42. As can be seen in FIG. 3, when the reverser control; i.e., pivotal lever handle 18, is in the "neutral" position, the two aligned segments 40 will be positioned within the slots 44 to thereby block any rotational movement of tubular member 42, and accordingly block any movement of second pivotal lever handle 16 so that the dynamic brake control cannot be moved from the "off" position. On the other hand, when the reverser control; i.e., pivotal lever handle 18, is in either the "forward" or "reverse" positions, one or the other of the two aligned segments 40 will be positioned directly within tubular member 42, so that tubular member 42 will be free to rotate about the segment 40 at its center, as depicted in FIG. 4. Accordingly, the dynamic brake control can be adjusted by moving pivotal lever handle 14 only when the reverser control is in the fully "forward" or fully "reverse" positions, and cannot be moved when the reverser is in any other intermediate position, including the neutral position. The lengths of segments 40 should be just slightly less than the diameter of tubular member 42 so that tubular member 42 can be revolved therearound, and yet provide segments 40 with sufficient length to fully positioned with the slots 44 to block rotation of the reverser handle 12 except when one or the other is positioned at the center of tubular member 42, as represented by the reverser handle 12 being fully in the forward of reverse positions.

As should be apparent from the above detailed description, a number of modifications and other embodiments could be incorporated without departing from the spirit of the invention. For example, the configuration of the first and second cam disks 20 and 20A are important only with regard to the surfaces adjacent to one another. Obviously, those edges not adjacent could be configured differently for the purposes of material saving, or to fit as required in any particular confined space. While the Figures illustrate the first and second cam disks 20 and 20A as having a peripheral surface defined by two radii, the above description refers to the area of smaller radius as a concave surface. It should be apparent that a simple concave surface is all that is necessary, and need provide only sufficient cut-away volume to permit the circular portion 22 of the adjacent cam disk to rotate therewithin. As illustrated in the FIG. 3 embodiment, the concave surface 24 on cam disk 30, must be more than just a simple indented portion in order to allow clearance for axle 32. With regard to the reverser interlocking apparatus as shown, it should be apparent that numerous modifications could be incorporated there as well. For example, the tubular member 42 could comprise a pair of semi-circular segments positioned in a circle with a space therebetween to allow for the slots 44. As another possible modification, it is clear that the two arcuate segments 36 need not be arcuate segments at all, but could be formed as simple posts adapted to obstruct rotation of arcuate segment 38 except to allow passage therebetween and on either side. Accordingly, it should be quite apparent that even other such modifications could be made without departing from the spirit of the invention.

I claim:

1. Apparatus for interlocking independent control handles for throttle action, dynamic brake action and reverser action, within a control stand for a railway locomotive comprising:

a first pivotal lever handle for controlling throttle action secured to a first rotatable axle, a second pivotal lever handle for controlling dynamic brake action secured to a second rotatable axle spaced from and substantially parallel to said first rotatable axle, a third pivotal lever handle for controlling reverser action secured to a third rotatable axle spaced from and substantially parallel to said first and second rotatable axles, said third pivotal lever handle being pivotal to three positions, a central neutral position and forward and reverse positions at either end, a first cam disk substantially perpendicularly mounted to said first axle for rotation therewith, a periphery of said first cam disk is defined by at least a partial cylindrical first surface radially spaced from said first axle, and a partial concave second surface adjacent to said at least partial cylindrical first surface, a second cam disk substantially perpendicularly mounted to said second axle for rotation therewith, a periphery of said second cam disk is defined by at least a partial cylindrical first surface radially spaced from said second axle, and a partial concave second surface adjacent to said at least partial cylindrical first surface, said first and second cam disks being disposed substantially in a common plane and directly adjacent to one another such that said concave second surface of each cam disk is directly opposed one another, so that only one of said first and second pivotal lever handles can be pivoted at any given time by virtue of said first cylindrical surface on an associated cam disk moving into engagement with an opposed concave second surface of an adjacent cam disk, a first stop means associated with said third axle adapted to block pivotal rotation of said first pivotal lever handle when said third pivotal lever handle is in any position other than forward, reverse and neutral, and a second stop means associated with said third axle adapted to block pivotal rotation of said second pivotal lever handle when said third pivotal lever handle is in any position other than forward and reverse.

2. Apparatus for interlocking independent control handles for throttle action, dynamic brake action and reverser action, according to claim 1, in which said first and second cam disks are substantially identical in size and configuration to permit interchangeable use.

3. Apparatus for interlocking independent control handles for throttle action, dynamic brake action and reverser action, according to claim 1, in which said first and second axles lie in a plane substantially parallel to a cover plate on said control stand.

4. Apparatus for interlocking independent control handles for throttle action, dynamic brake action and reverser action, according to claim 3, in which said third axle and one of said first and second axles lie in a plane substantially perpendicular to said cover plate.

5. Apparatus for interlocking independent control handles for throttle action, dynamic brake action and reverser action, according to claim 1, in which said third pivotal lever handle is movable only to a forward control position, a reverse control position and a neutral control position.

6. Apparatus for interlocking independent control handles for throttle action, dynamic brake action and reverser action, according to claim 5, in which said third pivotal lever handle is removable when in said neutral control position, to thereby lock said third axle in said neutral control position.

7. Apparatus for interlocking independent control handles for throttle action, dynamic brake action and reverser action, according to claim 1, in which said first and second stop means associated with said third axle are disposed on a third cam member substantially perpendicularly attached to said third axle for rotation therewith.

8. Apparatus for interlocking independent control handles for throttle action, dynamic brake action and reverser action, according to claim 7, in which said first stop means comprises at least two side-by-side stop means extending substantially at a right angle to said third cam member, adapted to engage at least one semi-circular segment extending substantially at a right angle to said first cam member when said third pivotal lever handle for controlling reverser action is in any position other than forward, reverse and neutral.

9. Apparatus for interlocking independent control handles for throttle action, dynamic brake action and reverser action, according to claim 8, in which said two side-by-side stop means comprise a pair of semi-circular segments.

10. Apparatus for interlocking independent control handles for throttle action, dynamic brake action and reverser action, according to claim 9, in which said at least two semi-circular segments are substantially parallel and spaced apart by a distance substantially equal to a thickness of said at least one semi-circular segment extending substantially at a right angle to said first cam member.

11. Apparatus for interlocking independent control handles for throttle action, dynamic brake action and reverser action, according to claim 10, in which said at least two semi-circular segments are disposed on said third cam member such that said at least one semi-circular segment can rotatably pass between said at least two semi-circular semi-circular segments when said third pivotal lever handle is in said neutral position.

12. Apparatus for interlocking independent control handles for throttle action, dynamic brake action and reverser action, according to claim 11, in which said at least two semi-circular segments are disposed such that said at least one semi-circular segment can rotatably pass on either side of said at least two semi-circular segments when said third pivotal lever handle is in either said forward or reverse positions.

13. Apparatus for interlocking independent control handles for throttle action, dynamic brake action and reverser action, according to claim 7 in which said second stop means comprises at least one semi-circular segment extending substantially at a right angle to said third cam member, adapted to engage at least one semi-circular segment extending substantially at a right angle to said second cam member when said third pivotal lever handle for controlling reverser action is in any position other than forward and reverse.

14. Apparatus for interlocking independent control handles for throttle action, dynamic brake action and reverser action, according to claim 13, in which said at least one semi-circular segment comprises two semi-circular segments aligned substantially on a common radius from said third axle, and said at least one semi-circular segment extending substantially at a right angle to said second cam member comprises a pair of semi-circular segments arranged to form a full circular configuration and spaced apart by a gap.

15. Apparatus for interlocking independent control handles for throttle action, dynamic brake action and reverser action, according to claim 13, in which said at least one semi-circular segment comprises two semi-circular segments aligned substantially on a common radius from said third axle, and said at least one semi-circular segment extending substantially at a right angle to said second cam member comprises a tubular member axially aligned with said second axle and having a slot through opposing surfaces.

16. Apparatus for interlocking independent control handles for throttle action, dynamic brake action and reverser action, according to claim 15, in which said two semi-circular segments are adapted to pass through said slot in said tubular member when said third pivotal lever handle is the neutral position.

17. Apparatus for interlocking independent control handles for throttle action, dynamic brake action and reverser action, according to claim 16, in which said two semi-circular segments will engage the slot edges of said tubular member to block pivotal rotation of said second pivotal lever handle.

18. Apparatus for interlocking independent control handles for throttle action, dynamic brake action and reverser action, according to claim 15, in which either of the two semi-circular segments will be positioned at the axial center of said tubular member when said third pivotal lever handle is either the forward or reverse position.

19. Apparatus for interlocking independent control handles for throttle action, dynamic brake action and reverser action, according to claim 18, in which said second pivotal lever handle is adapted to be pivoted to activate the dynamic brake when either of the two semi-circular segments is positioned at the axial center of said tubular member with said tubular member revolving about said semi-circular segment positioned at its axial center.

20. Apparatus for interlocking independent control handles for throttle action, dynamic brake action and reverser action, according to claim 19, in which each said two semi-circular segments have a length slightly less than a diameter of said tubular member.

* * * * *

UNITED STATES PATENT AND TRADEMARK OFFICE

CERTIFICATE OF CORRECTION

PATENT NO. : 5,492,511

DATED : February 20, 1996

INVENTOR(S) : Steve Kozminski

It is certified that error appears in the above-indentified patent and that said Letters Patent is hereby corrected as shown below:

Column 1, line 31, delete "08/340,237" and insert --08/340,239--;
column 1, line 47, before Apparatus, insert --Serial No. 08/340,526 titled--;
column 1, line 65, delete "i,e," and insert --i.e.--;
column 1, line 67, after Known, insert --as--.
Column 3, line 67, after from, insert --a full understanding of the following detailed description--.
Column 4, line 1, after the comma, delete "a full understanding of the following detailed description".
Column 6, line 16, delete "of" and insert --or--.
Column 7, line 24, delete "of" and insert --or--.
Column 9, line 24, after two, delete "semi-circular".

Signed and Sealed this

Twenty-eighth Day of May, 1996

Attest:

BRUCE LEHMAN

*Attesting Officer* *Commissioner of Patents and Trademarks*